United States Patent [19]

Chang et al.

[11] 3,767,427
[45] Oct. 23, 1973

[54] COMPOSITIONS USEFUL FOR IMPARTING A DEEP FAT FRIED AROMA AND FLAVOR TO FOODS

[76] Inventors: Stephen S. Chang, 29 Gloucester Ct., East Brunswick, N.J. 08816; William A. May, 853 W. Brightstar St., Thousand Oaks, Calif. 91360

[22] Filed: Sept. 14, 1971

[21] Appl. No.: 180,514

[52] U.S. Cl. .............................. 426/175, 426/205
[51] Int. Cl. ............................................. A23l 1/26
[58] Field of Search .................. 99/140 R, 123, 122, 99/122 M, 118 R; 260/343.6

[56] References Cited
UNITED STATES PATENTS

| | | | |
|---|---|---|---|
| 2,819,169 | 1/1958 | Boldingh et al. | 99/123 |
| 3,075,998 | 1/1963 | Lardelli et al. | 260/343.6 |
| 3,530,149 | 9/1970 | Fiecchi | 260/343.6 |
| 2,903,364 | 9/1959 | Wode et al. | 99/123 |

FOREIGN PATENTS OR APPLICATIONS 685,667   5/1964   Canada

OTHER PUBLICATIONS

"Chemicals Used In Food Processing," Nat'l. Acad. of Sci.-Nat'l. Res. Council, Publication No. 1274, Wash. D.C., (1965), pp. 113,131,133.

Watanabe et al., "Studies On the Changes Of Meat Fats By Various Processings," Agr. and Biol. Chem. (Japan), Vol. 32 (1968), pp. 191–196.

*Primary Examiner*—Morris O. Wolk
*Assistant Examiner*—Stephen B. Davis
*Attorney*—Thomas F. Moran et al.

[57] ABSTRACT

Unsaturated gamma lactones, including those unsaturated gamma lactones having from about $C_7$ to about $C_{10}$ carbon atoms with a single double bond, such as at either the 2 or 3 position, have been found to impart a deep fat fried aroma and flavor to foods when incorporated or added thereto in almost trace amounts, such as an amount in the range from about 0.5 to about 10 ppm by weight. Particularly useful are 4-hydroxy-2-nonenoic acid, lactone and 4-hydroxy-3-nonenoic acid, lactone which per se show a strong, sweet coconut and fried food odor. Mixtures of unsaturated gamma lactones or mixtures of unsaturated gamma lactones in combination with other compounds, such as 2,4-decadienal and unsaturated delta lactones, are useful to impart a deep fat fried aroma and flavor to foods. The above compounds can be added to various foods including substantially fat-free foods as well as various edible oils and margarine.

3 Claims, No Drawings

COMPOSITIONS USEFUL FOR IMPARTING A DEEP FAT FRIED AROMA AND FLAVOR TO FOODS

This invention relates to foodstuffs. In one embodiment this invention relates to the method of imparting a deep fat fried aroma and flavor to foodstuffs. In another embodiment this invention is directed to compositions useful for imparting a deep fat fried aroma and flavor to foodstuffs. In yet another embodiment this invention is directed to a margarine having improved flavor. In still another embodiment this invention is directed to a foodstuff having an improved flavor and/or aroma.

Foods possessing a deep fat fried aroma and flavor are usually appetizing to the taste and smell. Accordingly, it is desirable to produce foods with a deep fat fried flavor and aroma. It is also desirable to produce appetizing foods with a low or substantially negligible fat content. Deep fat fried foods, although possessing a desirable aroma and flavor, unfortunately also possess a high or substantial fat content and accordingly may be objectionable because of dietetic reasons.

It is an object of this invention to provide a food or foodstuff having a deep fat fried aroma and flavor but with a very low or negligible fat content.

It is another object of this invention to provide a foodstuff having a deep fat fried aroma and flavor without having subjected the foodstuff to actual deep fat frying.

It is yet another object of this invention to provide a margarine having improved flavor.

It is still another object of this invention to provide an improved flavor and aroma, such as a deep fat fried flavor and aroma, in snack foods and the like, such as baked snack food and chip products made from dehydrated potatoes and modified starch.

How these and other objects of this invention are accomplished will become apparent in the light of the accompanying disclosure. In at least one embodiment of the practice of this invention at least one of the foregoing objects will be achieved.

It has been discovered that unsaturated gamma lactones, particularly unsaturated gamma lactones having from about $C_7$ to about $C_{10}$ carbon atoms per molecule and having a single double bond, such as a single double bond at either the 2 or 3 position, when incorporated in a foodstuff improve the flavor of the foodstuff. Specifically, it has been discovered that when the above-described gamma lactones or mixtures thereof are incorporated in or admixed with a foodstuff the resulting foodstuff has imparted thereto an improved flavor and/or aroma, such as a deep fat fried aroma and flavor.

In accordance with one special embodiment of this invention it has been discovered that margarine or oleomargarine having incorporated therein a very minor, almost trace amount of the above-identified unsaturated gamma lactone, has imparted thereto an improved flavor and taste.

The following unsaturated gamma lactones are particularly useful in accordance with the practice of this invention for improving the flavor of foodstuffs, such as for imparting a deep fat fried aroma or flavor to foodstuff compositions containing the same, 4-hydroxy-2-nonenoic acid, lactone; 4-hydroxy-3-nonenoic acid, lactone and 4-hydroxy-4-nonenoic acid, lactone and mixtures thereof.

In the practice of this invention to impart a deep fat fried aroma and flavor to a foodstuff the aforesaid unsaturated gamma lactone is incorporated in the foodstuff in an amount in the range from about 0.1–0.5 to about 10–20 ppm by weight based on the foodstuff. Larger amounts of the unsaturated gamma lactone may be incorporated in the foodstuff, if desired. For example, a concentrated flavor composition useful in accordance with the practice of this invention for imparting a deep fat fried aroma or flavor to foodstuffs may be prepared by forming an admixture of a bland, substantially inert carrier, such as an edible oil, e.g., corn oil, cottonseed oil, soya oil, peanut oil, safflower oil and olive oil, together with a minor amount of the above-mentioned unsaturated gamma lactones, such as an amount of the unsaturated gamma lactone in the range 1.0 to about 10–20 percent by weight, more or less, based on the resulting composition.

It has been known that lactones are useful as flavoring agents, see particularly U.S. Pat. Nos. 2,819,169 and 2,903,364. Of some incidental interest see also U.S. 3,075,998, 3,325,514, 3,380,457, 3,476,572, 3,520,699 and 3,530,149. It was not known, however, until the present discovery and invention that the specific unsaturated gamma lactones disclosed herein, e.g., 4-hydroxy-2-nonenoic acid, lactone and 4-hydroxy-3-nonenoic acid, lactone imparted a deep fat fried aroma and flavor to foods when incorporated or admixed therewith in almost trace amounts, such as an amount in the range from about 0.5 to 10–20 ppm by weight. The unsaturated gamma lactones in accordance with this invention are useful alone or in admixture or in combination with other compounds, specifically 2,4-decadienal and unsaturated delta lactones, such as unsaturated delta lactones having from about seven to twelve carbon atoms per molecule.

As indicated hereinabove not only do the compositions in accordance with this invention impart a deep fat fried flavor and aroma to food, such as non-fried foods, e.g., baked foods and the like, or foods which contain little, if any, fats and oils before the addition of the special compounds in accordance with this invention thereto, but also the compounds disclosed herein have been found to impart an improved flavor and/or taste to margarine. Additionally, the compounds disclosed herein are useful to improve and/or increase the aroma and flavor of deep fat fried foods, such as by the addition of small, almost trace amounts of the unsaturated gamma lactones to such foods.

Illustrative of the practices of this invention, it is possible to produce an imitation potato chip from potato starch by baking. Normally when such food products are prepared these imitation potato chips do not possess the desirable deep fat fried aroma and flavor. By following the practices of this invention a deep fat fried aroma and flavor can be imparted to imitation potato chips and snack food prepared from potato starch by baking, by adding to the product during baking or immediately after baking, small amounts, as disclosed hereinabove, of an unsaturated gamma lactone, such as 4-hydroxy-2-nonenoic acid, lactone and 4-hydroxy-3-nonenoic acid, lactone. The imparting of a deep fat fried aroma and flavor to such imitation potato chips and snack foods may be accomplished by spraying the freshly baked imitation potato chips and similar foods with an edible oil containing a suitable amount of the unsaturated gamma lactone dissolved therein.

The following examples are illustrative of the practices of this invention:

Example No. 1

2.5 liters of a bland, fresh cottonseed oil were treatd under simulated deep fat frying conditions for 8 hours in order to produce a pleasant, distinct, deep fat fried flavor. To simulate deep fat frying conditions, 9 cotton balls each saturated with 1.5 ml of distilled water were fried in the oil in a deep fat fryer at 185°C. for 2 minutes. This procedure was repeated at 30 minute intervals until the oil had developed a distinct pleasant deep fat fried aroma and flavor as judged by an expert panel. This oil was then used as the control.

2.5 microliters of 4-hydroxy-2-nonenoic acid, lactone were then dissolved in 1 kilogram of a bland, fresh cottonseed oil. This oil was subjected to an organoleptic evaluation panel of 11 members by a paired comparison test using the deep fat fried oil, prepared as described hereinabove, as the control. The panel found that the oil containing about 2.5 parts per million of 4-hydroxy-2-nonenoic acid, lactone was similar in odor and flavor to the deep fat fried oil.

This test was repeated using 4-hydroxy-3-nonenoic acid, lactone instead of 4-hydroxy-2-nonenoic acid, lactone and the same results were obtained and observed.

Example No. 2

To commercial margarine 2.6 ppm of 4-hydroxy-3-nonenoic acid, lactone were added and uniformly blended therein. An organoleptic panel of 15 members was then asked to evaluate the margarine with and without the addition of the above-identified unsaturated gamma lactone. The panel indicated that the flavor of the margarine containing 2.6 ppm of 4-hydroxy-3-nonenoic acid, lactone was preferred to the margarine containing no such additive.

Those unsaturated gamma lactones which have the single carbon-to-carbon double bond at the two or three position are most useful in the practices of this invention for imparting a deep fat fried aroma and flavor to foodstuffs. The unsaturated gamma lactones in addition to those mentioned hereinabove which are also useful include 4-hydroxy-2-octenoic acid and 4-hydroxy-3-octenoic acid lactones.

In testing the various unsaturated gamma lactones useful in the practices of this invention, weanling mice were fed diets containing a mixture of 4-hydroxy-2-nonenoic acid, lactone, 4-hydroxy-3-nonenoic acid, lactone and 4-hydroxy-4-nonenoic acid lactone at levels of 300 ppm and 600 ppm. Upon completion of these tests the animals were sacrificed and examined for gross pathology. No growth-depressing activity or evidence of tumors development was observed.

In organoleptic tests the unsaturated gamma lactone, 4-hydroxy-3-nonenoic acid, lactone was tested in a bland oil at various levels 1 ppm, 2.5 ppm and 5 ppm. Of the seven members of the test panel five showed a first choice or preference for the use of this compound at a concentration level of 2.5 ppm as indicating a well balanced flavor with no over-powering notes.

The organoleptic tests indicated that gamma lactones having only a single unsaturated bond, i.e., a carbon-to-carbon double bond, at the two or three position when added to bland fats and oils untreated in any way imparted to the oil the characteristic deep fat fried flavor so important to the many deep fat fried foods.

Further indicative of the advantages obtainable in the practices of this invention a commercial product produced from dehydrated potatoes and starch and sold as a convenience or snack food was tested. 4-hydroxy-3-nonenoic acid, lactone in a bland cottonseed oil as a carrier was painted on a batch of this food product. The same bland cottonseed oil without any flavor additive was also painted on a separate batch of this food product. The products were then tested for the flavor acceptability. These tests showed that 4-hydroxy-3-nonenoic acid, lactone significantly improved the flavor of this commercial product in terms of preference.

As will be apparent to those skilled in the art in the light of the foregoing disclosure, many modifications, alterations and substitutions are possible in the practice of this invention without departing from the spirit or scope thereof.

We claim:

1. A substantially fat-free foodstuff having a deep fat fried flavor and/or aroma containing as its essential flavor ingredient an unsaturated gamma lactone selected from the group consisting of 4-hydroxy-2-nonenoic acid, lactone and 4-hydroxy-3-nonenoic acid, lactone, said unsaturated gamma lactone being present in said foodstuff in an amount in the range from about 0.1 to about 20 ppm by weight based on said foodstuff.

2. A foodstuff in accordance with claim 1 wherein said foodstuff is made up of dehydrated potatoes.

3. A foodstuff in accordance with claim 1 wherein said foodstuff is made up of dehydrated potatoes and starch.

* * * * *

UNITED STATES PATENT OFFICE
CERTIFICATE OF CORRECTION

Patent No. 3,767,427        Dated October 23, 1973

Inventor(s) Stephen S. Chang and William A. May

It is certified that error appears in the above-identified patent and that said Letters Patent are hereby corrected as shown below:

After "ABSTRACT", first page, the following paragraph should be inserted:

-- The invention described herein was made in the course of work under a grant or award from the Department of Health, Education and Welfare. --

Signed and sealed this 30th day of April 1974.

(SEAL)
Attest:

EDWARD M. FLETCHER, JR.
Attesting Officer

C. MARSHALL DANN
Commissioner of Patents